United States Patent [19]

Buhler, III

[11] 4,255,697
[45] Mar. 10, 1981

[54] CASH REGISTER POWER SUPPLY SYSTEM
[75] Inventor: Philip H. Buhler, III, Springfield, Va.
[73] Assignee: David Edwards, Vienna, Va.
[21] Appl. No.: 113,528
[22] Filed: Jan. 21, 1980
[51] Int. Cl.³ .............................. H02J 7/00; H02J 9/00
[52] U.S. Cl. ............................................ 320/6; 307/66; 320/14; 320/38; 365/229
[58] Field of Search ...................... 320/2–7, 320/8, 15, 14, 16–19, 54, 55, 56, 61, 37, 38; 307/45, 46, 48, 66, 149, 150; 322/4; 365/226, 229

[56] References Cited
U.S. PATENT DOCUMENTS

| 401,255 | 4/1889 | Currie | 320/6 X |
| 979,155 | 12/1910 | Gugler | 320/6 X |
| 3,845,835 | 11/1974 | Petit | 320/8 X |
| 3,909,685 | 9/1975 | Baker et al. | 320/15 X |
| 4,109,161 | 8/1978 | Iijima | 307/87 |
| 4,122,359 | 10/1978 | Breikss | 307/66 X |
| 4,143,283 | 3/1979 | Graf et al. | 307/66 |
| 4,214,172 | 7/1980 | See | 307/150 |

Primary Examiner—Robert J. Hickey
Attorney, Agent, or Firm—Stevens, Davis, Miller & Mosher

[57] ABSTRACT

A cash register power supply system is disclosed which isolates the work system from the battery charging system. A battery charger charges one of two batteries while the other battery drives a cash register. A timer and switching mechanism switch the batteries between charge and work systems at regular time intervals. Thus, the work system is isolated from the house current and the possibility of power surges which can affect the cash register memory.

6 Claims, 1 Drawing Figure

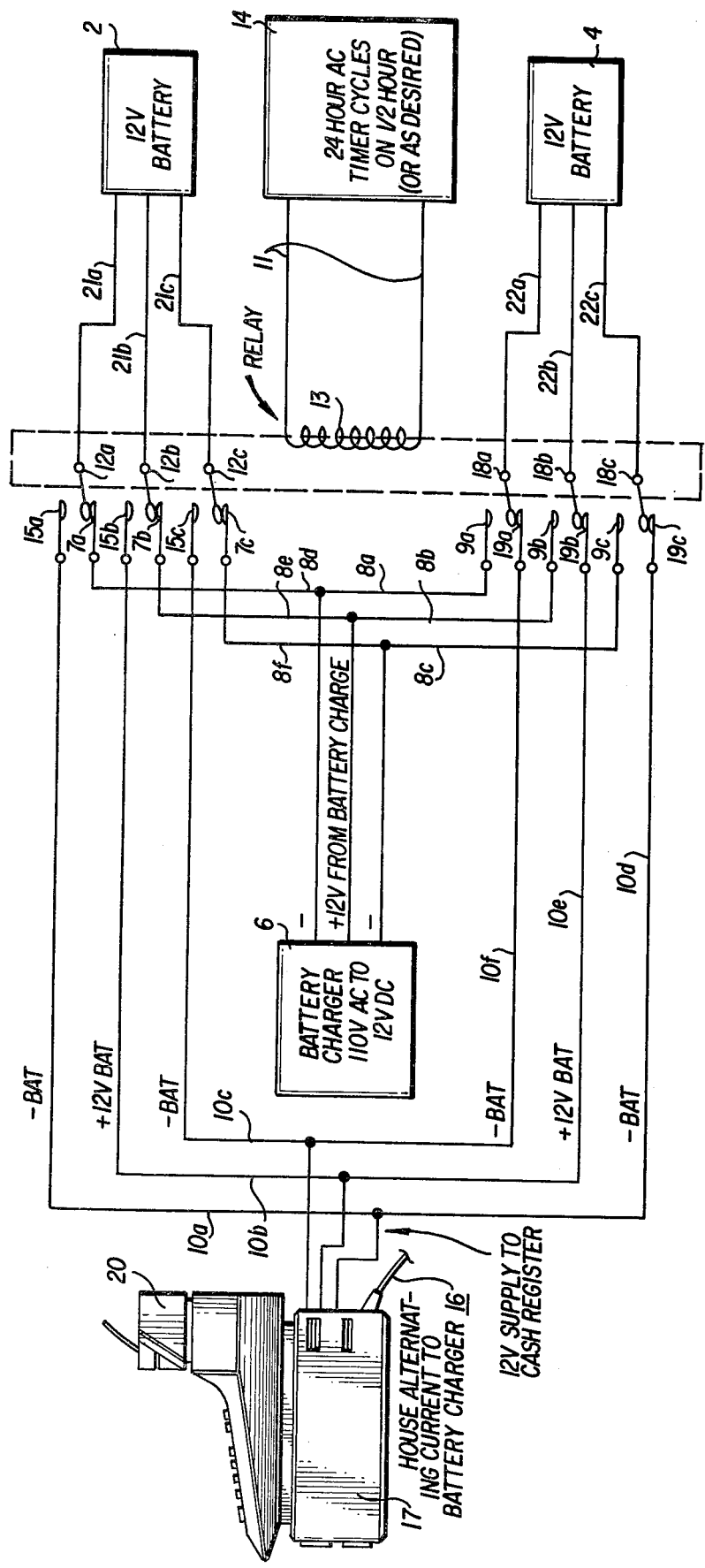

1

CASH REGISTER POWER SUPPLY SYSTEM

BACKGROUND OF THE INVENTION

1. Field of the Invention

This invention relates to cash register power supply systems, and more particularly, to battery powered cash register power supply systems having a work system isolated from the charge system.

2. Description of the Prior Art

Previous cash register power supply systems have had the problem of having a work system not isolated from the house alternating current. Thus, if a power surge or drop occurred, for example during an electrical storm, it would be transmitted to the cash register, often adversely affecting the cash register memory.

SUMMARY OF THE INVENTION

It is an object of this invention to provide a cash register power supply system which will protect the cash register memory from power surges or drops in the house alternating current.

It is a further object of this invention to provide a cash register power supply system that is of simple and economical construction.

The above objects and others are obtained by providing a cash register power supply system having separate battery charging and work systems, with an electromagnetic relay and a timer providing means for switching batteries from the battery charging system to the work system and vice versa.

BRIEF DESCRIPTION OF THE DRAWINGS

FIG. 1 shows a schematic view of the cash register power supply system.

DESCRIPTION OF THE PREFERRED EMBODIMENTS

Shown in FIG. 1 are batteries 2 and 4, battery charger 6, electrical connections 8a-f, 10a-f, 11, 16, 21a-c, and 22a-c; electrical contacts 7a-c, 9a-c, 15a-c, and 19a-c; electrical switches 12a-c and 18a-c, relay 13 such as an electromagnetic relay; activator 14 for relay 13 such as a 24-hour alternating current timer; and cash register 20 with bottom section 17.

As shown in FIG. 1, battery charger 6, electrically connected to an alternating current power supply such as the house current through electrical connection 16, is electrically connected to battery 2 through electrical connections 8d-f and 21a-c, switches 12a-c, and contacts 7a-c. This forms a battery charging system.

Battery 4 is electrically connected to cash register 20 by electrical connections 22a-c and 10d-f, switches 18a-c, and contacts 19a-c. This forms a work system for powering the cash register 20.

Upon operation of activator 14, relay 13 causes switches 12a-c and 18a-c to move. Switches 12a-c break contact with contacts 7a-c and make contact with contacts 15a-c. Switches 18a-c break contact with contacts 19a-c and make contact with contacts 9a-c. Thus, battery 2 becomes part of the work system, and battery 4 becomes part of the battery charging system. When activator 14 cycles again, the switches 12a-c and 18a-c move back to their original positions, and battery 2 becomes part of the battery charging system once more, and battery 4 becomes part of the work system once more.

The contacts 7a-c, 9a-c, 15a-c, and 19a-c are set for late break—early make, allowing no interruptions in the power supply to the cash register 20. At no time is battery charger 6 connected to the work system, making it impossible for power surges in the alternating current supply to reach the cash register and adversely affect the cash register memory. Power surges in the alternating current supply are directed through the charger 6 into the battery being charged. In the preferred embodiment, the cash register power supply system is enclosed within bottom section 17 of the cash register 20.

What is claimed is:

1. In combination with a cash register having a memory, a cash register power supply system, said system comprising:
   a. first and second batteries;
   b. a battery charging system comprising:
      1. an alternating current power source;
      2. a battery charger;
      3. said first battery;
      4. electrical connections between the alternating current power source and the battery charger; and
      5. electrical connections between the battery charger and the first battery;
   c. a work system comprising:
      1. said cash register having said memory;
      2. said second battery; and
      3. electrical connections between the cash register and the second battery;
   d. switching means electrically connecting said battery charging system and said work system, such that upon activation of the switching means, said first battery becomes part of the work system and said second battery becomes part of the battery charging system;
   e. activation means for the switching means, such that the switching means is activated at regular time intervals; and
   f. said alternating current power supply and said cash register having said memory, wherein;
      1. said alternating current power supply and said cash register having said memory are electrically connected by said battery charging system, said work system, said switching means, and said activation means; and
      2. said alternating current power supply is isolated from said cash register having said memory by said battery charging system, said work system, said switching means, and said activation means.

2. The combination of claim 1, wherein:
   a. said switching means comprise an electromagnetic relay, electric switches and electric contacts.

3. The combination of claim 2, wherein:
   a. said switches and said contacts are set for early make-late break.

4. The combination of claim 1, wherein:
   a. said activation means comprise an alternating current timer set to cycle at regular intervals, and electrical connections between said timer and said switching means.

5. The combination of claim 1, wherein:
   a. said switching means comprise an electromagnetic relay, electric switches, and electric contacts;
   b. said electric switches and said contacts are set for early make-late break; and c. said activation means comprises an alternating current timer set to cycle at regular intervals and electrical connections between said timer and said electromagnetic relay.

6. In combination with a cash register having a memory, a cash register power supply system, said system comprising:
   a. first and second batteries;
   b. a battery charging system comprising:
      1. an alternating current power source;
      2. a battery charger;
      3. said first battery;
      4. electrical connections between the alternating current power source and the battery chargers; and
      5. electrical connections between the battery charger and the first battery;
   c. a work system comprising:
      1. said cash register having said memory;
      2. said second battery;
      3. electrical connections between the cash register and the second battery;
   d. switching means electrically connecting said battery charging system and said work system, such that upon activation of the switching means, said first battery becomes part of the work system and said second battery becomes part of the battery charging system, said switching means comprising:
      1. an electromagnetic relay, electric switches, and electric contacts; and
      2. said electric switches and said electric contacts being set for early make-late break;
   e. activation means for the switching means, such that the switching means is activated at regular time intervals, said activation means comprising:
      1. an alternating current timer set to cycle at regular time intervals; and
      2. electrical connections between said timer and said electromagnetic relay; and
   f. said alternating current power supply and said cash register having said memory, wherein;
      1. said alternating current power supply and said cash register having said memory are electrically connected by said battery charging system, said work system, said switching means and said activation means; and
      2. said alternating current power supply is isolated from said cash register having said memory by said battery charging system, said work system, said switching means, and said activation means.

\* \* \* \* \*